(12) United States Patent
Jiang et al.

(10) Patent No.: US 11,336,443 B2
(45) Date of Patent: May 17, 2022

(54) KEY DISTRIBUTION METHOD AND SYSTEM BASED ON SYNCHRONIZED BROADBAND PHYSICAL RANDOM SOURCES

(71) Applicant: University of Electronic Science and Technology of China, Chengdu (CN)

(72) Inventors: Ning Jiang, Chengdu (CN); Kun Qiu, Chengdu (CN); Anke Zhao, Chengdu (CN); Shiqin Liu, Chengdu (CN); Yiqun Zhang, Chengdu (CN)

(73) Assignee: UNIVERSITY OF ELECTRONIC SCIENCE AND TECHNOLOGY OF CHINA, Chengdu (CN)

(*) Notice: Subject to any disclaimer, the term of this patent is extended or adjusted under 35 U.S.C. 154(b) by 0 days.

(21) Appl. No.: 17/423,901

(22) PCT Filed: Jul. 30, 2020

(86) PCT No.: PCT/CN2020/105973
§ 371 (c)(1),
(2) Date: Jul. 19, 2021

(87) PCT Pub. No.: WO2021/052032
PCT Pub. Date: Mar. 25, 2021

(65) Prior Publication Data
US 2022/0045857 A1  Feb. 10, 2022

(30) Foreign Application Priority Data

Sep. 20, 2019  (CN) .......................... 201910896569.3

(51) Int. Cl.
*H04L 9/08* (2006.01)
*H04B 10/556* (2013.01)
*H04L 9/00* (2022.01)

(52) U.S. Cl.
CPC ....... *H04L 9/0869* (2013.01); *H04B 10/5561* (2013.01); *H04L 9/001* (2013.01); *H04L 9/0825* (2013.01)

(58) Field of Classification Search
CPC ..... H04L 9/0869; H04L 9/001; H04L 9/0825; H04B 10/5561
(Continued)

(56) References Cited

U.S. PATENT DOCUMENTS 8,374,350 B2* 2/2013 Yuan ................... H04L 63/1466
380/255
2001/0056556 A1* 12/2001 Sugino .................. H04Q 11/04
714/703
(Continued)

FOREIGN PATENT DOCUMENTS

CN 107769859 A 3/2018
CN 109462479 B * 1/2019 ............... H04L 9/12
(Continued)

*Primary Examiner* — Abbas H Alagheband
(74) *Attorney, Agent, or Firm* — Bayramoglu Law Offices LLC

(57) ABSTRACT

A key distribution method based on broadband physical random sources includes: utilizing a driving semiconductor laser to generate an optical signal, passing the optical signal through a phase modulator driven by a random signal and then equally dividing the phase-modulated optical signal into two identical paths, injecting the two identical paths into slave semiconductor lasers at both communication parties Alice and Bob's sides, respectively, to generate initial synchronized signals, using the generated initial synchronized signals as driving signals to phase-modulate optical signals generated by continuous-wave (CW) light sources, and inputting the modulated optical signals to dispersion modules; wherein after the modulated CW optical signals pass through the dispersion modules, two synchronized broadband noise-like random signals are generated, and then (Continued)

high-speed synchronized keys are generated by a post-processing method.

10 Claims, 5 Drawing Sheets

(58) Field of Classification Search
USPC .......................................... 398/43; 713/171
See application file for complete search history.

(56) References Cited

U.S. PATENT DOCUMENTS

| | | | |
|---|---|---|---|
| 2006/0280509 A1* | 12/2006 | Tomaru | H04L 9/0858 398/188 |
| 2007/0297810 A1* | 12/2007 | Tomaru | H04B 10/70 398/200 |
| 2010/0027794 A1* | 2/2010 | Yuan | H04L 63/1466 380/278 |
| 2016/0047643 A1* | 2/2016 | Yuan | G01B 9/0201 398/25 |
| 2018/0080770 A1* | 3/2018 | Chamoun | G01C 19/66 |
| 2018/0109064 A1* | 4/2018 | Kanskar | H01S 3/0085 |
| 2018/0231870 A1* | 8/2018 | Takasaka | G02F 1/39 |
| 2018/0241553 A1* | 8/2018 | Lucamarini | H04B 10/70 |
| 2020/0274703 A1* | 8/2020 | Lukens | G06N 10/00 |

FOREIGN PATENT DOCUMENTS

| | | | |
|---|---|---|---|
| CN | 109462479 A | | 3/2019 |
| CN | 110768780 A | | 2/2020 |
| JP | 2004356996 A | * | 12/2004 |
| WO | 2017204440 A1 | | 11/2017 |

* cited by examiner

KEY DISTRIBUTION METHOD AND SYSTEM BASED ON SYNCHRONIZED BROADBAND PHYSICAL RANDOM SOURCES

CROSS REFERENCE TO THE RELATED APPLICATIONS

This application is the national phase entry of International Application No. PCT/CN2020/105973, filed on Jul. 30, 2020, which is based upon and claims priority to Chinese Patent Application No. 201910896569.3, filed on Sep. 20, 2019, the entire contents of which are incorporated herein by reference.

TECHNICAL FIELD

The present invention relates to the fields of chaos, semiconductor lasers, and key distribution, and specifically, to a high-speed key distribution method and system based on broadband physical random sources.

BACKGROUND

In the past several years, the rapid development of communication technology has dramatically changed people's lives. On one hand, communication enables people to live more conveniently and efficiently and share resources more smoothly. However, the attendant information hazards are becoming increasingly severe, forcing people to pay more and more attention to secure communication. Secure communication is not only related to personal privacy and property security, but also relates to all aspects of the development and stability of a country. With the continuous improvement of the communication rate, high-speed secure communication has become a goal that people constantly explore and seek.

Claude E. Shannon, the founder of information theory, proposed a model of a secure communication system in 1949. In this model, the encryption and decryption mechanisms are abstracted as a pair of transformations for encryption and decryption between both communication parties, and the secure communication system is characterized as two channels, including a common channel for transmitting the encryption and decryption transformation configurations and a secret channel for transmitting keys. Both communication parties firstly share a key through the secret channel, and then the sender encrypts plaintext with the key and sends the ciphertext to the receiver through the common channel. Eavesdroppers cannot participate in the exchange of key information over the secret channel, and thus cannot obtain the plaintext information even if they get the ciphertext information. Shannon's theory proves that the encryption scheme of "one-time pad" is unconditionally secure. To realize this unconditionally secure communication, it is necessary to simultaneously ensure: 1) the key must be random; 2) the key generation rate must not be less than the rate of transmission plaintext; and 3) the key must be discarded after being used once, rather than being reused. The key to the one-time pad secure communication is to realize a key distribution in the communication process. Nowadays, the development of communication technology enables the transmission rate to become higher and higher. Thus, in order to realize high-speed secure communication, it is necessary to generate high-speed keys for transmission information encryption.

SUMMARY

To address the above-mentioned problems, the present invention aims to design a physical random source for generating synchronized broadband high-complexity random signals, so that synchronized high-speed physical random numbers can be extracted from these signals and can be used as the synchronized keys in a one-time pad encryption communication system to encrypt the information, thereby realizing a reliable high-speed key distribution.

To realize the above-mentioned objective of the present invention, the present invention proposes a key distribution method and system based on broadband physical random sources. According to the technical solution adopted by the present invention, the method includes: utilizing a driving semiconductor laser (DSL) to generate an optical signal, passing the optical signal through a phase modulator driven by a random signal and then equally dividing the phase-modulated optical signal into two identical paths, injecting the two identical paths into slave semiconductor lasers at both communication parties Alice and Bob's sides, respectively, to generate initial synchronized signals, using the generated initial synchronized signals as driving signals to phase-modulate optical signals generated by continuous-wave (CW) light sources, and inputting the modulated optical signals into dispersion modules; wherein after the modulated CW optical signals pass through the dispersion modules, two synchronized broadband noise-like random signals are generated, and then two high-speed synchronized keys are extracted from the two synchronized broadband noise-like random signals in combination with a post-processing method.

BRIEF DESCRIPTION OF THE DRAWINGS

FIGS. 4A-4B schematically show the consistency and rate variations of synchronized keys generated by both communication parties; wherein FIG. 4A shows the consistency (BER) of the synchronized keys generated by both communication parties versus the dual threshold quantization coefficient adopted in the present invention; and FIG. 4B shows the rate of the synchronized keys generated by both communication parties versus the coefficient of the dual threshold quantization coefficient adopted in the present invention.

FIGS. 5A-5B schematically show the National Institute of Standards and Technology (NIST) randomness test results of the synchronized keys; wherein FIG. 5A shows the success proportions of passing through the National Institute of Standards and Technology (NIST) randomness test sites including 15 terms; and FIG. 5B shows the parameter P-value of the National Institute of Standards and Technology (NIST) randomness test sites.

DSL, driving semiconductor laser; SSL, slave semiconductor laser; PM, phase modulator; AWG, arbitrary waveform generator; PC, polarization controller; FC, fiber coupler; PD, photodetector; Amp, electronic amplifier; D, dispersion module; VOA, variable optical attenuator; and ISO, optical isolator.

DETAILED DESCRIPTION OF THE EMBODIMENTS

To clarify the objectives, technical solutions and advantages of the present invention, the technical solutions of the present invention will be further described in detail below in conjunction with the drawings.

Figure 1:
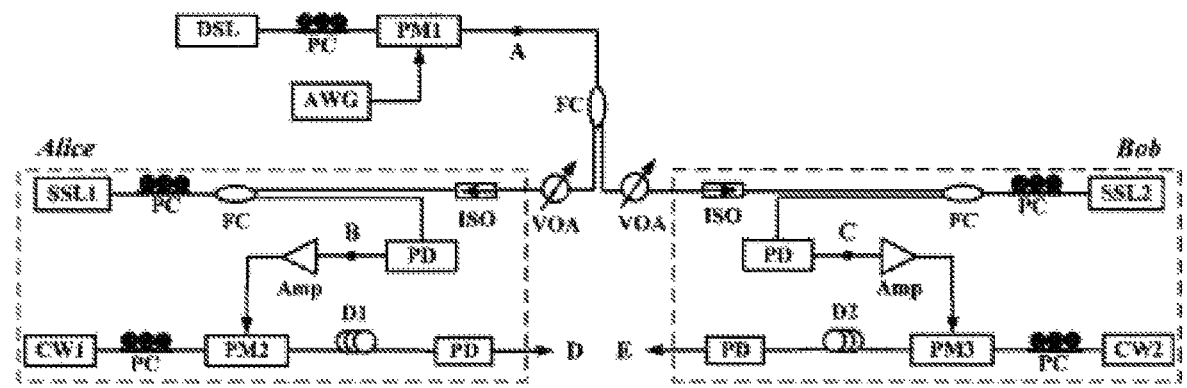
FIG. 1 is a block diagram of broadband physical random sources proposed by the present invention.

The system proposed by the present invention includes two modules at each communication party, namely a broadband physical random source and a post-processing module. As shown in FIG. 1, an output optical signal of the driving semiconductor laser (DSL) is inputted to a phase modulator (PM1) after passing through a polarization controller. The driving signal of the phase modulator is a Gaussian white noise signal generated by an arbitrary waveform generator (AWG).

The optical signal outputted by PM1 is divided into two identical paths by a fiber coupler. After passing through a variable optical attenuator and an optical isolator respectively, the signals in the two identical paths are injected into slave semiconductor lasers (SSLs) at Alice's side and Bob's side. By passing the output optical signals of the slave semiconductor lasers through photodetectors and electronic amplifiers, initial synchronized signals will be generated.

The initial synchronized signals serve as the driving signals of the phase modulators PM2 and PM3 at Alice's side and Bob's side, respectively, to phase-modulate a continuous-wave (CW) optical signal generated by a distributed feedback laser (DFB). The output optical signals of PM2 and PM3 are propagated through the dispersion modules D1 and D2, respectively, and then inputted into photodetectors to consequently generate two synchronized broadband random signals. The phase modulator can employ a Mach-Zehnder modulator (MZM) or an electro-optic phase modulator. The dispersion module can be constructed with a single mode fiber (SMF), a dispersion compensation module (DCM) or a chirped fiber Bragg grating (CFBG).

In the post-processing module, the synchronized signals generated by the broadband physical random sources are used to generate the synchronized high-speed keys by a post-processing method. The post-processing method includes a dual threshold quantization and a delayed bit exclusive OR.

EMBODIMENTS

The present invention will be further explained below.

Figure 2A:
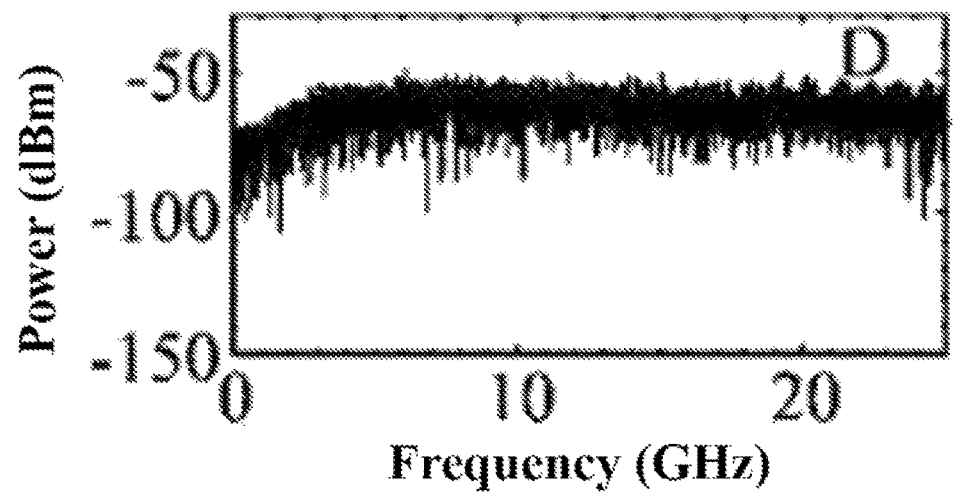
FIGS. 2A-2B schematically show power spectrums of output signals of the broadband physical random source in both communication parties.
Figure 2B:
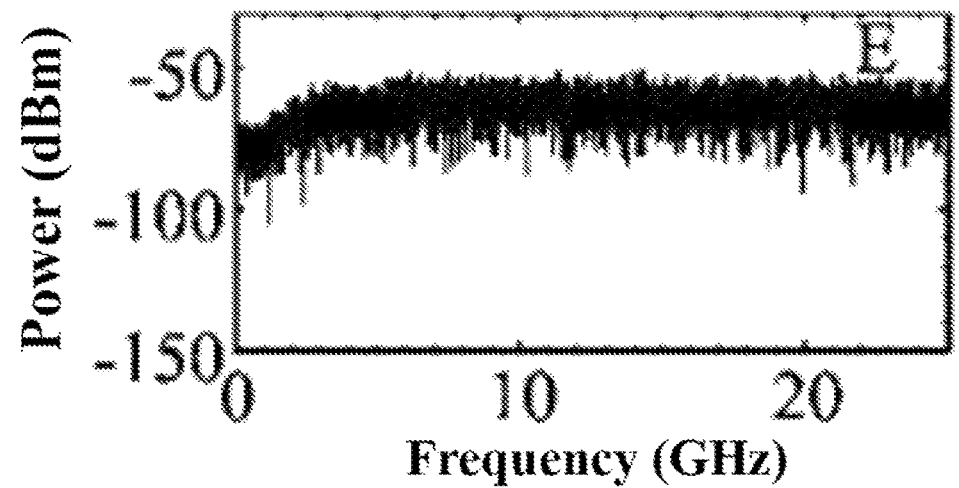
Figure 3A:
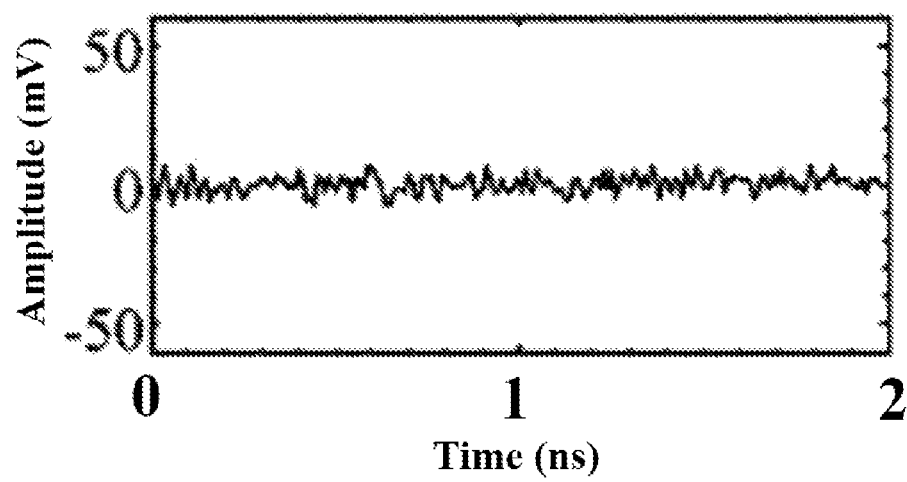
FIG. 3A schematically shows the time domain waveform of the output signal of the DSL (at point A in FIG. 1)
Figure 3B:
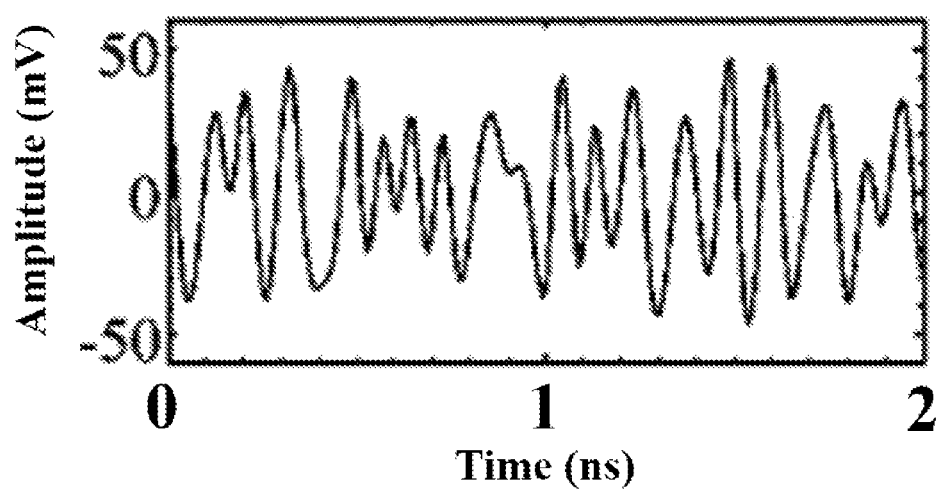
FIG. 3B schematically shows the time domain waveform of the output signal at Alice's side (point D in FIG. 1)
Figure 3C:
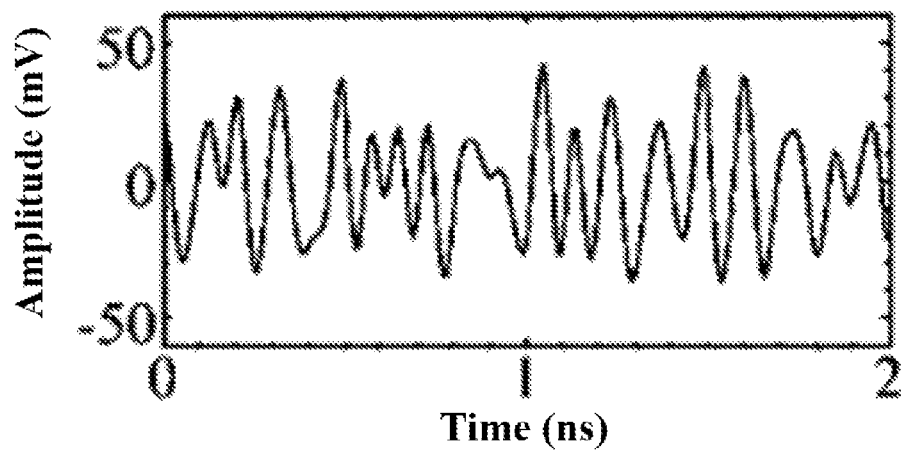
FIG. 3C schematically shows the time domain waveform of the output signal at Bob's side (point E in FIG. 1)
Figure 3D:
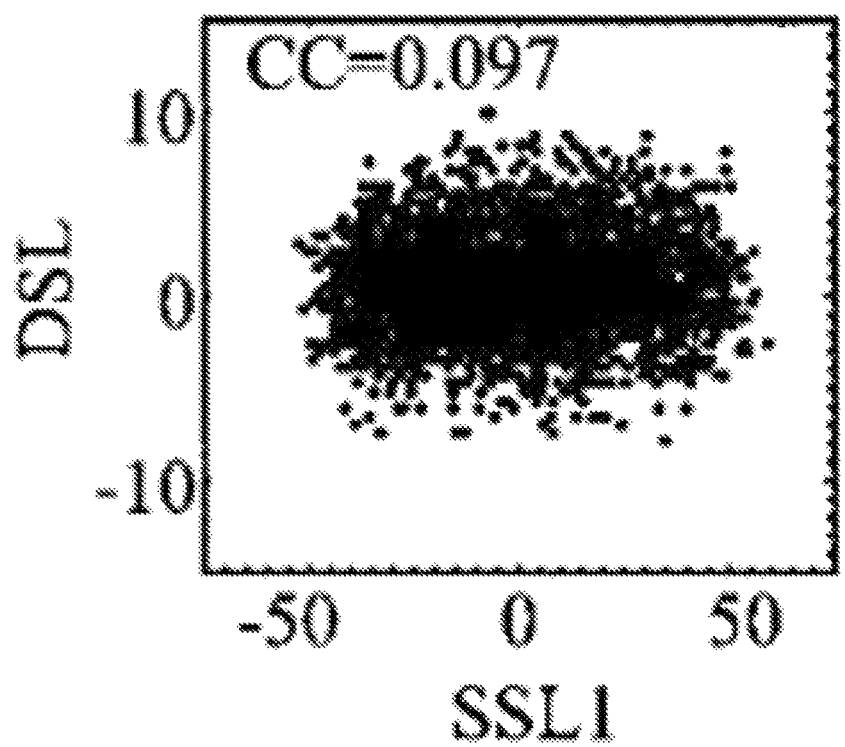
FIG. 3D shows the cross-correlation between the output signal of the DSL and the output signal at Alice's side.
Figure 3E:
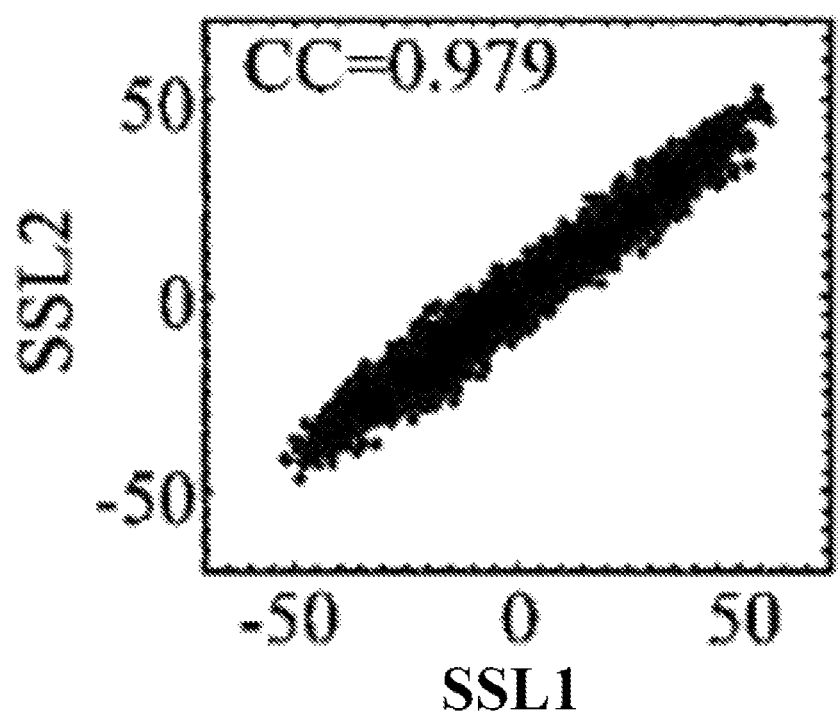
FIG. 3E shows the cross-correlation between the output signals of both communication parties.

FIGS. 2A-2B schematically show the power spectrums of the output signals generated by the broadband physical random sources at both Alice's side and Bob's side. In the present invention, the effective bandwidth that is defined as the span between direct current component and the frequency that contains 80% of the energy in the power spectrum, is used to indicate the bandwidth of the signals. It can be seen that with the technical solution proposed by the present invention, random signals with wideband bandwidth and flat power spectrums are generated, and its effective bandwidth exceeds 22 GHz. In addition, it is worth mentioning that the effective bandwidth is mainly limited by the bandwidths of electronic devices (photodetectors and oscilloscopes) in the experiment. When electronic devices with higher bandwidth are employed, the bandwidth of the signals will be wider.

FIGS. 3A-3E schematically show the synchronization characteristics of the broadband physical random sources of both communication parties. In the present invention, the cross-correlation coefficient (CC) is introduced to quantify the correlation between the output signals of both communication parties. On one hand, the broadband random signals generated at Alice's side (point D in FIG. 1) and Bob's side (point E in FIG. 1) are highly correlated, with a cross-correlation coefficient as high as 0.951, so that synchronized keys can be extracted from the broadband random signals in combination with a post-processing method. On the other hand, the correlation between the externally injected signal generated by the DSL (point A in FIG. 1) and the broadband random signals generated by both communication parties is very low (CC=0.097). Since only the output signal of the DSL will be transmitted in the public link, the security of the signals generated by the local broadband physical random sources of both communication parties is guaranteed.

Figure 4A:
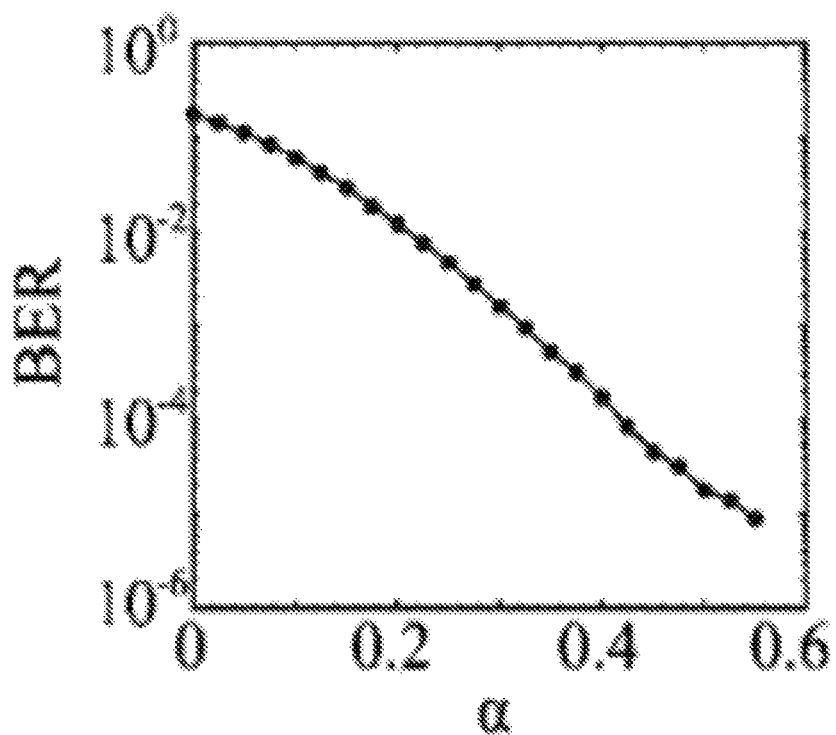
Figure 4B:
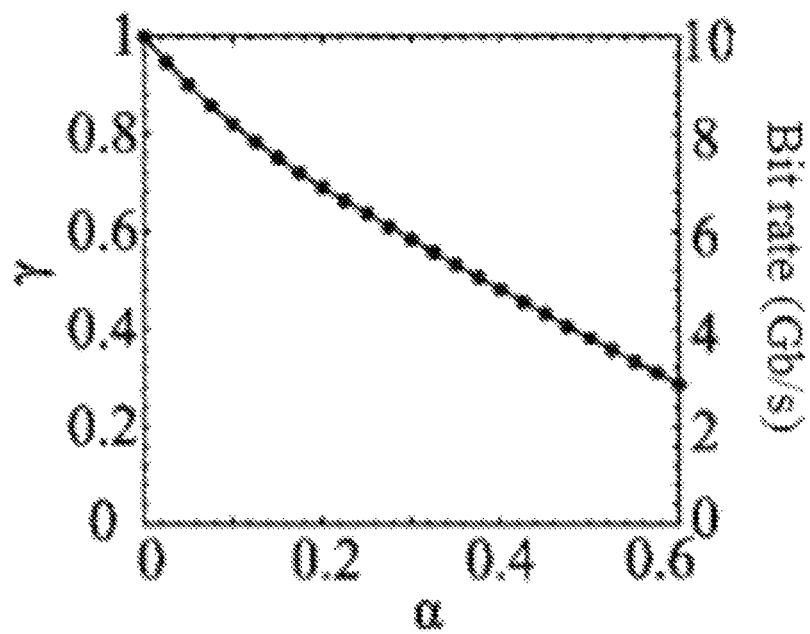

FIGS. 4A-4B schematically show the consistency and rate variations of the synchronized keys extracted from the broadband physical entropy sources at Alice's side and Bob's side. In the present invention, the bit error rate (BER) is introduced to quantify the consistency of the synchronized keys. Visibly, the BER decreases as the dual threshold quantization coefficient α increases. When α increases to 0.55, the BER decreases below $10^{-5}$, and the corresponding key rate is as high as 3.1 Gb/s.

Figure 5A:
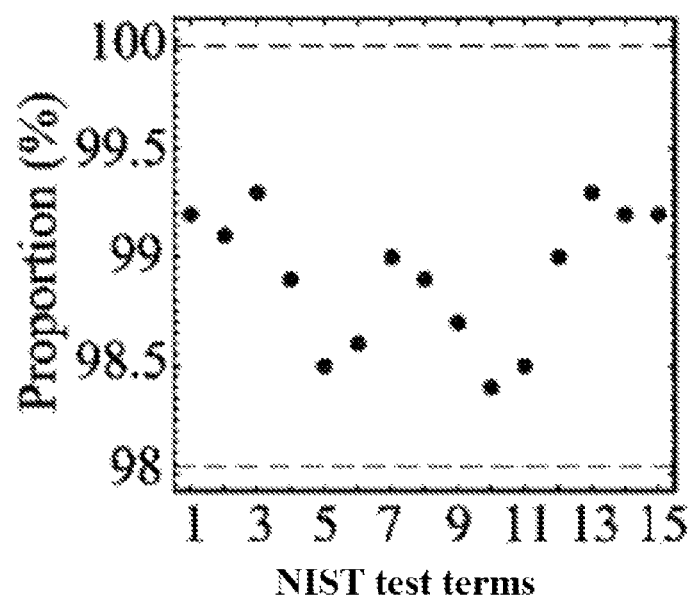
Figure 5B:
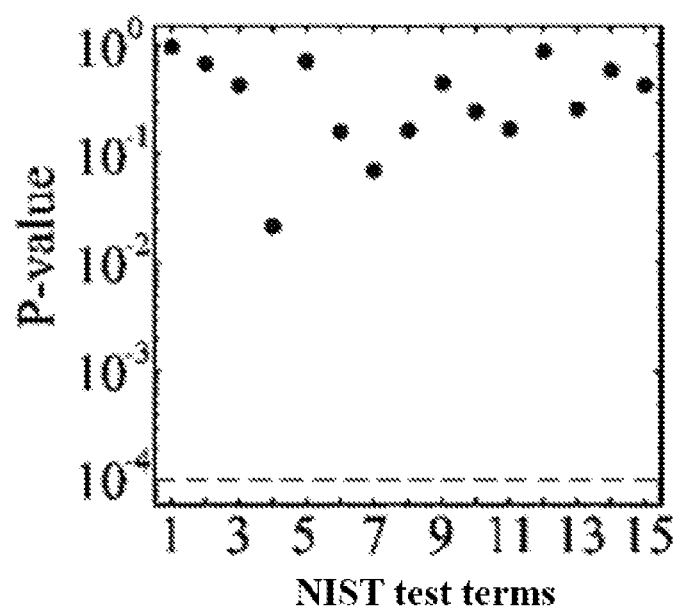

FIGS. 5A-5B schematically show the results of the randomness tests for the generated synchronized keys. It is indicated that the synchronized keys have passed all the 15 NIST randomness tests.

To sum up, the technical solution proposed by the present invention provides the following advantages: (1) the physical random sources designed by the present invention can generate random signals with wide bandwidth and excellent spectral flatness, with an effective bandwidth exceeding 22 GHz; (2) a high correlation between the broadband physical random sources of both communication parties is achieved, and the cross-correlation coefficient of the signals generated from both communication parties is as high as 0.95; and (3) high-speed synchronized keys at a rate exceeding 3 Gb/s can be extracted from the broadband physical random source, and the high-speed synchronized keys can pass all the NIST randomness tests. On the basis of the present invention, high-speed secure communication can be achieved by applying the generated synchronized keys to a one-time pad encryption system.

What is claimed is:
1. A key distribution method based on broadband physical random sources, comprising:
utilizing a driving semiconductor laser to generate an optical signal, passing the optical signal through a phase modulator driven by a random signal and then equally dividing the phase-modulated optical signal into two identical paths, injecting the two identical paths into slave semiconductor lasers at both communication parties Alice and Bob's sides, respectively, to generate initial synchronized signals, using the generated initial synchronized signals as driving signals to phase-modulate optical signals generated by continu- ous-wave (CW) light sources, and inputting the modulated optical signals to dispersion modules; wherein after the modulated optical signals pass through the dispersion modules, synchronized broadband noise-like random signals are generated, and then high-speed synchronized keys are generated by a post-processing method.

2. The key distribution method based on the broadband physical random sources of claim 1, wherein
the post-processing method comprises a dual threshold quantization and a delayed bit exclusive OR.

3. The key distribution method based on the broadband physical random sources of claim 1, wherein
the phase modulator employs a Mach-Zehnder modulator (MZM) or an electro-optic phase modulator.

4. The key distribution method based on the broadband physical random sources of claim 1, wherein
the dispersion module is constructed with a single mode fiber (SMF), a dispersion compensation module (DCM) or a chirped fiber Bragg grating (CFBG).

5. A key distribution system based on broadband physical random sources, comprising
a broadband physical random source and a post-processing module;
wherein
in the broadband physical random source, an output optical signal of a driving semiconductor laser is inputted to a first phase modulator after passing through a polarization controller; a driving signal of the first phase modulator is a Gaussian white noise signal generated by an arbitrary waveform generator (AWG);
an optical signal outputted by the first phase modulator is divided into two identical paths by a fiber coupler; after passing through a variable optical attenuator and an optical isolator respectively, signals in the two identical paths are injected into slave semiconductor lasers at an Alice's side and a Bob's side; by passing output optical signals of the slave semiconductor lasers through first photodetectors and electronic amplifiers, initial synchronized signals are generated;
the initial synchronized signals serve as driving signals of a second phase modulator at the Alice's side and a third phase modulator at the Bob's side, respectively, to phase-modulate a CW optical signal generated by a distributed feedback laser (DFB); output optical signals of the second phase modulator and the third phase modulator are propagated through a first dispersion module and a second dispersion module, respectively, and then inputted into second photodetectors to consequently generate synchronized broadband random signals; and in the post-processing module, final broadband synchronized signals generated by the physical random source are configured to generate synchronized high-speed keys by a post-processing method.

6. The key distribution system based on the broadband physical random sources of claim 5, wherein
the post-processing method comprises a dual threshold quantization and a delayed bit exclusive OR.

7. The key distribution system based on the broadband physical random sources of claim 5, wherein
each of the first phase modulator, the second phase modulator and the third phase modulator employs a Mach-Zehnder modulator (MZM) or an electro-optic phase modulator.

8. The key distribution system based on the broadband physical random sources of claim 5, wherein
each of the first dispersion module and the second phase modulator is constructed with a single mode fiber (SMF), a dispersion compensation module (DCM) or a chirped fiber Bragg grating (CFBG).

9. The key distribution system based on the broadband physical random sources of claim 1, wherein
the high-speed synchronized keys can be extracted from the synchronized broadband noise-like random signals in combination with the post-processing method.

10. The key distribution system based on the broadband physical random sources of claim 5, wherein
the synchronized high-speed keys can be extracted from the synchronized broadband random signals in combination with the post-processing method.

* * * * *